United States Patent Office 2,938,894
Patented May 31, 1960

2,938,894
PROCESS FOR THE MODIFICATION OF OLEFIN POLYMERS

Calvin V. Smalheer, Gates Mills, and William M. Le Suer, Cleveland, Ohio, assignors to The Lubrizol Corporation, Wickliffe, Ohio, a corporation of Ohio No Drawing. Filed Oct. 9, 1957, Ser. No. 689,039

5 Claims. (Cl. 260—139)

This invention relates to an improved process for the conversion of certain olefin polymers to acidic products. It relates in a more particular senses to such a process which makes available lighter colored acidic products than have been available heretofore.

The reaction of olefin polymers with inorganic phosphorus- and sulfur-containing reagents has long been known as a convenient source of acidic products which are useful as intermediates in the preparation of a wide variety of commercially attractive compositions. Generally these acidic products are reacted further with metal bases to produce the corresponding metal salts and these metal salts then are used in such applications as the rust-proofing of ferrous metal surfaces, inhibitors of corrosion in crankcase lubricants, paint driers, stabilizers of vinyl chloride polymers, and many other commercial uses. In almost all of these commercial uses it is desirable and frequently necessary that the metal salt of the phosphorus- and sulfur-containing acidic product of this process be light in color. The reason for this, of course, is that a light-colored product of any sort is more appealing to the buyer than a similar dark-colored product.

Many different types of products are available from the reaction of olefin polymers with phosphorus- and sulfur-containing inorganic reagents. These differences are associated with the differences in types of phosphorus- and sulfur-containing reagents. Thus these reagents may include phosphorus pentasulfide, thiophosphoryl chloride, phosphorus trisulfide, a combination of phosphorus trichloride and sulfur, and many others. The latter, a combination of phosphorus trichloride and sulfur, may be reacted with olefin polymers to give a particularly useful product which may be further treated with steam and then with a basic neutralizing agent to yield a product useful as an additive in crankcase lubricants. Such a product, i.e., the final metal salt, must as indicated above have a desirably light color to be acceptable to those who formulate the finished crankcase lubricant, and it has been noted that metal salts prepared by the reaction of an olefin polymer with phosphorus trichloride and elemental sulfur are characterized by a somewhat darker shade of color than that which is ordinarily acceptable to the trade. The performance characteristics of this metal salt when used as an additive for crankcase lubricants are excellent, however, so that this material is useful in spite of its unsatisfactory color.

It is apparent that an improvement in the color of such a product would enhance its usefulness to a marked degree and it is accordingly a principal object of this invention to provide an improved process for the preparation of phosphorus- and sulfur-containing metal salts.

A further object of the present invention is the provision of a metal salt of a phosphorus- and sulfur-containing acid characterized by a relatively light color.

A further object of the present invention is the provision of a process comprising the reaction of an olefin polymer with phosphorus trichloride and sulfur, followed by treatment with steam, to produce a light-colored acidic product.

These and other objects are accomplished by the process for the preparation of phosphorus- and sulfur-containing acids which comprises preparing a mixture of a polymer of a lower mono-olefin, from about 0.5 to about 5.0 moles of sulfur, and from about 0.001 to about 0.1 mole of a metal salt of a phosphorodithioic acid selected from group I and group II metal salts thereof, heating said mixture to a temperature within the range of about 140° C. to about 250° C., adding from about 0.5 to about 5.0 moles of phosphorus trichloride to said heated mixture, and then treating the resulting mass with steam at a temperature within the range of about 110° C. to about 200° C.

It will be noted that the ultimate problem of color with respect to the products of this invention is associated with the color of the metal salt of the acidic product of the above process. The color of the product of the above process, however, is a direct indication of the color of the metal salt which results from such acidic product, viz., if the acidic product is light in color then the metal salt prepared from this acidic product will likewise be light. The problem of color of the metal salt therefore can be solved by improving the color of the acidic product from which the metal salt is prepared.

The polymeric reactant of the process of this invention is a polymer of a lower mono-olefin, viz., a polymer of ethylene, propylene, butene-1, and isobutylene. In most cases this polymer is a homopolymer of isobutylene and the molecular weight of this homopolymer is within the range of 250–3000. Other polymers, including copolymers are also contemplated, but such copolymers are those characterized by a large proportion of lower mono-olefin units. Thus such copolymers are exemplified by copolymers of 90% isobutylene and 10% styrene, where the percentage of the second monomer unit is relatively small. Other homopolymers of lower mono-olefins are also contemplated. Lower molecular weight polyisopropylenes and polyethylenes have been found to be useful in this process and they are included within the scope of the invention.

The lower molecular weight polyisobutylenes which are preferred as the polymeric reactant, for reasons of solubility and viscosity of the reaction products in mineral oil, are readily available materials and can be prepared conveniently by polymerization of isobutylene at temperatures within the range of about −60° C. to about 40° C. in the presence of an ionic catalyst such as boron fluoride. The preparation of such low molecular weight polymers is exemplified by the following process: A hydrocarbon mixture containing about 25% of isobutylene is cooled to about −15° C. and from about 0.1% to about 2% of boron fluoride, based upon the isobutylene content of the material treated, is added with vigorous agitation. The exothermic nature of the polymerization causes it to require efficient cooling. When the polymerization has subsided the reaction mass is neutralized and washed free of acidic substances arising from the catalyst. The resulting polymer is separated from the unreacted hydrocarbons by distillation. The residual polymer so obtained, depending upon the temperature of reaction, contains polymeric chains having molecular weights within the range of 100 to 2000.

The mechanism of the process is believed to involve first a reaction of the olefin polymer with the sulfur resulting in sulfurization of the polymer followed by reaction of this sulfurized polymer with the phosphorus trichloride. The presence of the relatively small amount of the metal phosphorodithioate constituent is responsible for the improved color of the product which results. The relative amounts of the reactants may be varied within wide limits. Approximately equimolar proportions appear to be the optimum, but, considering the amount of polymer as one mole, the amount of sulfur may be varied within the range of about 0.5 to about 5.0 moles. Also the amount of phosphorus trichloride may be varied within this same numerical range. The preferred amount of sulfur is 1.25 moles (per mole of polymer), and the preferred amount of phosphorus trichloride is 1.0 mole. With respect to the amount of metal phosphorodithioate which is to be used, this material is effective in very small proportions but is more effective in larger proportions up to a maximum of about 0.1 mole (per mole of polymer). The range of proportions of this ingredient is about 0.001 to about 0.1 mole. A particularly preferred concentration of this metal phosphorodithioate constituent is about 0.012 mole thereof per mole of polymer.

The process may be carried out either by adding concurrently the surfur and the phosphorus trichloride to a mixture of the polymer and metal phosphorodithioate or alternatively, a mixture of the polymer, sulfur and metal phosphorodithioate may be prepared first and the phosphorus trichloride added to this mixture. We have noted before the minimum temperature at which the phosphorus trichloride is to be added is about 140° C. In view of the fact that phosphorus trichloride boils at a temperature considerably below this minimum reaction temperature it is necessary to add the phosphorus trichloride portionwise to the hot reaction mixture. Furthermore the reaction vessel should ordinarily be equipped with means for returning volatilized unreacted phosphorus trichloride to the system and such means in most cases can be provided by a reflux condenser. In order to minimize the loss of unreacted phosphorus trichloride from the process mixture it also is desirable in many cases to add this reagent by introducing it beneath the surface of the reaction medium and thereby causing it to bubble up through the mixture. The temperature limits within which the process of this invention may be carried out range from about 140° C. to about 250° C. The lower temperature is that minimum which is required for a satisfactory rate of reaction; the higher temperature represents the practical upper limit of the range. Higher temperatures such as 300° C. or even higher may be employed, but with no advantage and in some cases with the attendant disadvantage of some decomposition of the constituents of the process mixture.

The metal phosphorodithioate component of the reaction mass of this invention may be any group I or group II metal salt of a phosphorodithioic acid; and while the alkaline earth metal salts thereof are preferred, especially the barium salts, because of their greater effectiveness the other members of the group I and group II metals are likewise useful. These metals include principally lithium, sodium, potassium, magnesium, calcium, strontium, copper, silver, zinc, cadmium and mercury; these are more useful than the others because of their greater availability, but the others likewise are contemplated as being within the scope of useful metal salts for the purpose of this invention. Another type of particularly useful metal salt includes the zinc salts of phosphorodithioic acids.

The phosphorodithioic acid residue of the metal phosphorodithioate reaction component is derived from the reaction of phosphorus pentasulfide with 4 moles of an alcohol or a phenol. A wide variety of alcohols and phenols may be employed in such a process for the purposes of this invention. Generally, for reasons of availability, these alcohols or phenols will be the simpler unsubstituted compounds such as ethanol, isobutyl alcohol, the various octyl alcohols, dodecanol, isopropyl phenol, diisobutyl phenol, etc.; although such substituted alcohols and phenols as ethylene chlorohydrin, 2,4-dichlorophenol, etc. may also be used to provide suitable phosphorodithioic acids from which the metal phosphorodithioate reactant of the process of this invention may be prepared.

The product which results from the reaction of an olefin polymer with elemental sulfur and phosphorus trichloride, as above described, contains phosphorus, sulfur and chlorine. The chlorine is fairly reactive. Treatment of this product with steam at a temperature within the range of 110° C. to about 200° C. results in hydrolysis of most of the chlorine and removal also of a considerable proportion of the sulfur. Although it has been found that the minimum temperature of 110° C. is entirely satisfactory with respect to achieving these results, as a matter of convenience this steam treatment generally is carried out at a higher temperature because the preceding step in the process must be carried out at a temperature within the above stated range of 140–250° C. It is apparent that the following steam treatment step may be carried out more conveniently at the same temperature as that of the preceding step. This generally is about 160–190° C.

The invention may be illustrated in more detail by the following examples in which the NPA color rating is a numerical index of the color of a sample as determined by visual comparison of a 5% solution (in oil) of the sample with a series of different colored standards ranging from a light lemon colored standard having a rating of 1 to a deep red standard having a rating of 8. The oil used as the solvent for the samples has a rating of 1.5.

*Example 1*

A mixture of 4000 grams (5.3 moles) of polyisobutylene having an average molecular weight of 750, 213 grams (6.7 moles) of sulfur, 134 grams (0.066 mole) of the barium salt of a phosphorodithioic acid prepared by the reaction of phosphorus pentasulfide and an alcohol mixture consisting of 50 mole percent of capryl alcohol, 37.5 mole percent of 4-methyl-2-pentyl alcohol, and 12.5 mole percent of cyclohexyl alcohol, was heated to 150° C. To this mixture there was added portionwise 740 grams (5.3 moles) of phosphorus trichloride at 160–165° C. during a period of 6 hours. After the addition, the mixture was heated at 160–165° C. for 3 hours and then at 160° C./30 mm. for 1.5 hours. The residue was diluted with 2000 grams of mineral oil. Steam was passed through the mixture at 150–160° C. for 2 hours. The hydrolyzed product was then dried by heating at 150–160° C./28 mm. for 2 hours and was found to have the following analysis:

Percent P _____ 2.1
Percent S _____ 1.65
NPA color _____ 4.5

*Example 2*

To a mixture of 64 grams (2 moles) of sulfur, 750 grams (1 mole) of polyisobutylene having an average molecular weight of 750, and 25 grams (0.0125 mole) of the barium salt of a phosphorodithioic acid prepared as in Example 1, there was added portionwise at 150–155° C. 276 grams (2 moles) of phosphorus trichloride during a period of 4 hours. After the addition the mixture was heated at 150–160° C. for 5 hours and then at 160–165° C./28 mm. for 1 hour. The residue was diluted with 375 grams of mineral oil and treated with steam at 150–165° C. for 2 hours. The hydrolyzed product was dried at 145–155° C./28 mm. for 1 hour and had the following analysis:

Percent P _____ 3.6
Percent S _____ 2.3
NPA color _____ 4.5

*Example 3*

A mixture of 40 grams (1.25 moles) of sulfur, 750 grams (1 mole) of polyisobutylene having an average molecular weight of 750, and 3.5 grams (0.0125 mole)

of cuprous diisopropyl phosphorodithioate, was heated to 155° C. To this mixture there was added portionwise at 160–165° C. 138 grams (1 mole) of phosphorus trichloride during a period of 2.5 hours. The mixture was heated at 160–165° C. for 2 hours and then at 145–165° C./20 mm. for 1 hour. The residue was diluted with 375 grams of mineral oil, and steam was passed through the mixture at 155–165° C. for 2 hours. After being dried at 145–165° C./25 mm. for 2 hours, the hydrolyzed product was found to have the following analysis:

Percent P _____ 2.1
Percent S _____ 1.2
NPA color _____ 4.5

*Example 4*

Sodium diisopropyl phosphorodithioate (11.8 grams, 0.05 mole) and sulfur (40 grams, 1.25 moles) were added to 750 grams (1 mole) of polyisobutylene having an average molecular weight of 750. To this mixture there was added at 160–165° C. 138 grams (1 mole) of phosphorus trichloride during a period of 2.5 hours. The mixture was heated at 160–165° C. for 10 hours, at 150–155° C./20 mm. for 1 hour, diluted with 375 grams of mineral oil, and hydrolyzed by passing steam through the mixture at 145–160° C. for 2 hours. It was then dried by heating at 160–165° C./20 mm. for 1 hour and filtered. The filtered product had the following analysis:

Percent P _____ 2.0
Percent S _____ 1.5
NPA color _____ 5

*Example 5*

A mixture of 40 grams (1.25 moles) of sulfur, 750 grams (1 mole) of polyisobutylene having a molecular weight of 750, and 8 grams (0.0125 mole) of barium di-(heptylphenyl) phosphorodithioate was heated to 160° C. To this mixture there was added at 165° C. 138 grams (1 mole) of phosphorus trichloride. The mixture was heated at 165° C. for 3 hours, at 170° C. for one-half hour, and was diluted with 375 grams of mineral oil. Steam was then passed through the mixture at 160° C. for 2 hours. The mixture was dried by heating at 160° C., filtered, and was found to have the following analysis:

Percent P _____ 2.1
Percent S _____ 1.9
NPA color _____ 4

*Example 6*

To a mixture of 23 grams (0.047 mole) of zinc diisopropyl phosphorodithioate, 750 grams (1 mole) of polyisobutylene having an overage molecular weight of 750, and 48 grams (1.5 moles) of sulfur, there was added at 165° C. 138 grams (1 mole) of phosphorus trichloride. The mixture was heated at 160–165° C. for one hour and at 160° C./20 mm. for 2 hours. Mineral oil (375 grams) was added to the residue, and steam was passed through the mixture at 160–165° C. for 2 hours. The hydrolyzed product was then dried by heating at 130–150° C. for one-half hour with 30 grams of diatomaceous earth and filtered. The filtrate had the following analysis:

Percent P _____ 1.7
Percent S _____ 1.5
NPA color _____ 5

*Example 7*

To a mixture of 750 grams (1 mole) of polyisobutylene having an average molecular weight of 750, 32 grams (1 mole) of sulfur, and 48 grams (0.1 mole) of zinc diisopropyl phosphorodithioate, there was added 138 grams (1 mole) of phosphorus trichloride during a period of 1 hour. The reaction mass was heated at 175–180° C. for 2 hours and then at 175° C./50 mm. for 1 hour. Mineral oil (376 grams) was added to the residue, and steam was passed through the mixture at 165° C. for 2 hours. The hydrolyzed product was dried by heating at 160° C. for one-half hour and filtered. The filtrate had the following analysis:

Percent P _____ 2.4
Percent S _____ 1.1
NPA color _____ 3.5

The above examples illustrate the process of this invention. An understanding of the effectiveness of this process can be gained by comparison of the color of the products of this process with the color of products prepared by processes of the prior art. Examples 8 and 9 show such a process.

*Example 8*

To a mixture of 64 grams (2 moles) of sulfur and 750 grams (1 mole) of polyisobutylene having an average molecular weight of 750, there was added portionwise at 150–155° C., 276 grams (2 moles) of phosphorus trichloride during a period of 4 hours. The mixture was heated at 150–160° C. for 5 hours and then at 160° C./28 mm. for 1 hour. The residue was diluted with 375 grams of mineral oil, and steam was passed through the mixture at 150–160° C. for 2 hours. The product was dried by heating at 150–160° C./28 mm. for 1.5 hours and had the following analysis:

Percent P _____ 3.2
Percent S _____ 1.4
NPA color _____ 8

*Example 9*

A mixture of 40 grams (1.25 moles) of sulfur and 750 grams (1 mole) of polyisobutylene having an average molecular weight of 750 was heated to 160° C. To this mixture there was added portionwise at 160–165° C. 138 grams (1 mole) of phosphorus trichloride during a period of 3 hours. The mixture was heated at 160–165° C. for 3 hours and then at 150–160° C./35 mm. for 1.5 hours. The residue was diluted with 375 grams of mineral oil, and steam was passed through the mixture at 145–160° C. for 2 hours. The product was then dried by heating at 150–155° C./35 mm. for 1 hour and was found to have the following analysis:

Percent P _____ 1.9
Percent S _____ 1.6
NPA color _____ 6.5

It will be noted that the products of this invention have NPA color ratings ranging from 3.5 to 5 whereas the NPA color ratings of the two products of Examples 8 and 9 (the prior art processes) are 8 and 6.5 respectively. An acceptable product for the trade should have a NPA color rating no greater than 5.

A further advantage which characterizes the herein-described process is associated with the utilization of the phosphorus trichloride reactant in the process. Thus a greater percentage of the phosphorus trichloride used is found as phosphorus in the ultimate product. The advantages of this feature are evident. In some instances this increased utilization of phosphorus trichloride is as high as 30% over that which may be observed in the case of prior art processes.

Other modes of applying the principle of the invention may be employed, change being made as regards the details described, provided the features stated in any of the following claims or the equivalent of such be employed.

We therefore particularly point out and distinctly claim as our invention:

1. A process for the preparation of phosphorus- and sulfur-containing acids which comprises preparing a mixture of a polymer of a lower mono-olefin, from about 0.5 to about 5.0 moles of sulfur, and from about 0.001 to about 0.1 mole of a barium salt of a phosphorodithioic acid, heating said mixture to a temperature within the range of about 140° C. to about 250° C., adding from about 0.5 to about 5.0 moles of phosphorus trichloride to said heated mixture, and then treating the resulting mass with steam at a temperature within the range of about 110° C. to about 200° C.

2. A process for the preparation of phosphorus- and sulfur-containing acids which comprises preparing a mixture of a polymer of a lower mono-olefin, from about 0.5 to about 5.0 moles of sulfur, and from about 0.001 to about 0.1 mole of a zinc salt of a phosphorodithioic acid, heating said mixture to a temperature within the range of about 140° C. to about 250° C., adding from about 0.5 to about 5.0 moles of phosphorus trichloride to said heated mixture, and then treating the resulting mass with steam at a temperature within the range of about 110° C. to about 200° C.

3. A process for the preparation of phosphorus- and sulfur-containing acids which comprises preparing a mixture of a polymer of isobutylene, about 1.25 moles of sulfur, and about 0.012 mole of barium salt of a phosphorodithioic acid, heating said mixture to a temperature within the range of about 140° C. to about 250° C., adding about 1.0 mole of phosphorus trichloride to said heated mixture, and then treating the resulting mass with steam at a temperature within the range of about 110° C. to about 200° C.

4. A process for the preparation of phosphorus- and sulfur-containing acids which comprises preparing a mixture of a polymer of a lower mono-olefin, from about 0.5 to about 5.0 moles of sulfur, and from about 0.001 to about 0.1 mole of a metal salt of a phosphorodithioic acid selected from the class consisting of barium, zinc, copper and sodium salts of phosphorodithioic acids, heating said mixture to a temperature within the range of about 140° C. to about 250° C., adding from about 0.5 to about 5.0 moles of phosphorus trichloride to said heated mixture, and then treating the resulting mass with steam at a temperature within the range of about 110° C. to about 200° C.

5. The process of claim 4 characterized further in that the polymer of a lower mono-olefin is a polyisobutylene.

References Cited in the file of this patent
UNITED STATES PATENTS

| | | |
|---|---|---|
| 2,262,813 | Morway et al. | Nov. 18, 1941 |
| 2,721,862 | Brennan | Oct. 25, 1955 |